No. 683,521. Patented Oct. 1, 1901.
L. TEUSCHER.
ANCHOR FOR PIPES OF CONDUITS IN ELECTRICAL OR OTHER SYSTEMS.
(Application filed May 16, 1901.)
(No Model.)
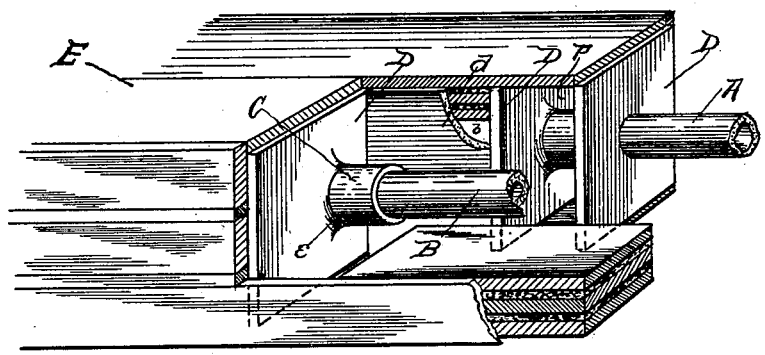
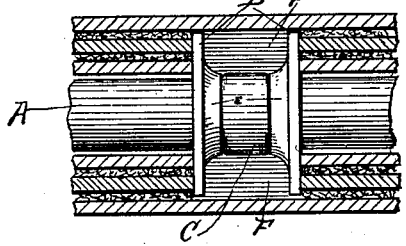 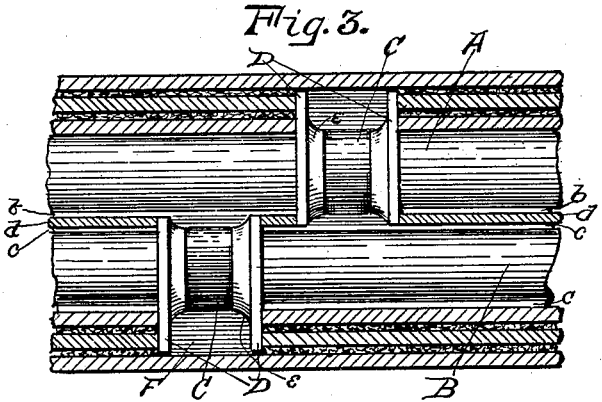
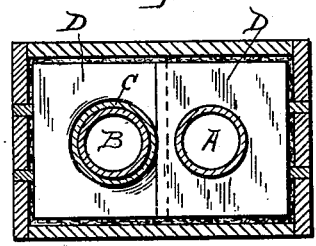
Witnesses:
Clement R. Hickney
M. Friel
Inventor:
Louis Teuscher,
by Frank H. Thomann,
Attorney.

UNITED STATES PATENT OFFICE.

LOUIS TEUSCHER, OF LAPORTE, INDIANA.

ANCHOR FOR PIPES OF CONDUITS IN ELECTRICAL OR OTHER SYSTEMS.

SPECIFICATION forming part of Letters Patent No. 683,521, dated October 1, 1901.

Application filed May 16, 1901. Serial No. 60,561. (No model.)

*To all whom it may concern:*

Be it known that I, LOUIS TEUSCHER, a citizen of the United States, and a resident of Laporte, in the county of Laporte and State of Indiana, have invented certain new and useful Improvements in Anchors for the Pipes of Conduits in Electrical or other Systems, of which the following is a full, clear, and exact specification.

The pipes of underground-conduit systems for electrical, steam, or hot-water transmission expand longitudinally, and various devices have been introduced to allow the pipes to accommodate themselves to this expansion without impairing the efficiency of the system. Among other means one of the most common employed for this purpose is a U-shaped bend, which connects the ends of alining sections of pipe at suitable intervals along the system. This expansion and contraction create a tendency in these sections of pipe thus connected to "creep," and to prevent this "creeping" various devices have been applied to said sections mediate their ends. Heretofore the ability of these devices depended upon their attachment in a transverse plane to the structure of the conduit in which the pipe was inclosed and they involved the use of a multiplicity of parts, which required considerable time and labor to assemble and adjust them, and were so arranged as to be difficult of access and made it necessary to take the same apart when it was desired to get at the coupling, which most of them are adapted to embrace.

The object of my invention is to provide very simple means which dispenses with nuts and bolts and such like, is itself accessible, and leaves the coupling easy to get at without necessitating its being disturbed, and relies entirely upon the end thrust or impingement it has against the longitudinally-disposed surrounding structure of the outer conduit for its ability to anchor the pipe. This I accomplish by the means and in the manner hereinafter fully described, and as particularly pointed out in the claims.

In the drawings, Figure 1 is a perspective view of a broken-away part of an outer conduit having its nigh end in cross-section and exposing to view my invention in such a way as to illustrate the manner of its use. Fig. 2 is a longitudinal vertical section through a portion of conduit in which my improvements are employed. Fig. 3 is a horizontal transverse section of the same. Fig. 4 is a transverse vertical section of said conduit.

Referring to the drawings, A and B represent the positive and negative or the outgoing and returning legs, respectively, of a system of pipe for the transmission of forces capable of imparting heat, whether electrical, gaseous, or liquid. At or near the point where it is desired to anchor the sections of pipe in order to prevent them from creeping I slip over the ends of pipe lengths, which have their adjacent ends connected by the same coupling C, two anchor-plates D D, and when said pipe lengths are connected together move said plates D D toward each other until they abut against the ends of and inclose the coupling C between them. These plates are preferably of rectangular shape, and the opening made in them for the pipe to pass through is less in diameter than that of said coupling. When the pipe-section so provided with these anchor-plates is sufficiently connected together and laid, the conduit for insulating the same is built around it.

I have in the accompanying drawings illustrated and shown my invention as applied to a double or two-pipe conduit; but it will hereinafter be made apparent that said invention can be applied to a single or one-pipe conduit just as well. In the drawings this outer conduit E is of a laminated construction, consisting of alternating layers of wood and insulating material which are arranged in such manner that the pipes A and B traverse the longitudinal passages $b$ and $c$, extending through the same, and are thoroughly insulated on all sides and so that the layers of wood or board form the exterior shell or casing of the same. The passages $c$ and $b$ of the conduit are shown as separated by a board partition $d$. This partition $d$, as well as the surrounding structure of the conduit, however, may be constructed as shown or otherwise, according as desired. At points in the conduit where the anchor-plates are located I cut away the interior structure of the conduits, all except the outer casing or shell, to form chambers F for the accommodation of said anchor-plates. These chambers are of a length corresponding to the distance between the outer faces of plates D D, and their transverse dimensions correspond to the superficial area of the broad sides of said plates.

The chambers F for the anchor-plates of both sections of pipe A and B may be in the same transverse plane. In this event said chambers might be opened to each other and their united transverse dimensions would then occupy the entire space inclosed within the outer shell or casing of the conduit. I prefer, however, to make said chambers F for the respective sections of pipe A and B at points wherever the coupling C, against which the anchor-plates are to be placed, would happen to come during the construction of the pipe-line. This will differ according to the difference in the course of the sections of pipe and the difference in their connections, and, as shown in the drawings, said chambers will as a rule be staggered or separated. In this latter event the central partition $d$ may be continuous throughout the length of the conduit or not, as deemed best. It will thus be observed that the ends of the boards or other structure inclosed within the outer casing or shell of the conduit bear against the outer faces of the anchor-plates in both directions, and when the tendency to creep is developed in the pipe by reason of the expansion or contraction thereof the end thrust of the plates against said boards or other interior construction of the conduit resists such tendency, and the elasticity of said conduit restores the pipe to its normal position when the contraction thereof takes place. If desired, the plates D may be provided with annular flanges or a boss $e$, surrounding the opening through which the pipe passes. This is a mere matter of design, however, and, while its use is desired, it could be dispensed with. By this method of construction the pipe is securely anchored in the conduit by means wholly within the same. There are no breaks in the insulating or heat-retaining walls, but merely a reduction in thickness of the portions of the walls extending over the space between the anchor-plates, and the chambers thereby formed are, in fact, air-tight inclosures, which afford almost perfect insulation or retain heat almost as well as the conduit-walls. Furthermore, said chambers provide a means of ready access to the pipe-joints for the inspection and repair thereof. Said anchor-plates may be also applied at opposite ends of a T, a gate, a hand-hole, or inspection-plug casing, as well as to the ends of a coupling, and no modification in form of the plate would be required for such use.

It is obvious that this means of anchoring can be adapted to a variety of conduits, and I do not limit the invention to any special form of construction except as set forth in the claims.

I claim as my invention—

1. The combination with a conduit, and a line of pipe therein, of anchoring means secured at intervals on the pipe, adapted to transmit the end thrust of said pipe to the conduit.

2. The combination with a conduit, and a line of pipe therein, of anchoring means secured at intervals on said pipe, comprising anchor-plates adapted to transmit end thrust of said pipe to the walls of the conduit.

3. The combination with a conduit, and a line of pipe therein, of anchoring means secured at intervals on said pipe, comprising anchor-plates having abutting relation to the inner portions of the conduit-walls, and adapted to transmit end thrust of said pipe to said walls.

4. The combination with a conduit, and a line of pipe therein, of anchor-plates secured at intervals on said pipe, the faces of said anchor-plates having abutting relation to the inner portions of the conduit-walls and adapted to transmit end thrust of said pipe to said walls.

5. The combination with a conduit, and a line of pipe therein provided at intervals with couplings or sleeves, of anchor-plates on said pipe, bearing against the end edges of said couplings or sleeves and abutting against the inner portions of the conduit-walls and thereby transmit the end thrust of said pipe to said inner portions.

6. The combination with a conduit, a line of pipe therein, and a coupling or sleeve on said pipe, of anchor-plates each bearing with one face against one end of said coupling or sleeve, the other faces of said plates having abutting relation with the inner portions of the conduit-walls, whereby end thrust of said pipe in either direction is transmitted to said conduit-walls.

7. The combination with a conduit and lengths of pipe therein, and a coupling connecting their adjacent ends of anchor-plates embracing said ends, adapted to bear with their proximate faces against the end edges of the coupling, and their outer faces abutting against the inner portions of the conduit-walls.

8. The combination with a conduit, and lengths of pipe therein, and a coupling connecting their adjacent ends of anchor-plates, each comprising a collar apertured to have sliding engagement with said pipe lengths, and a flange projecting from said collar, the proximate faces of said collars abutting against the end edges of said coupling, and the outer faces of said flanges having abutting relation with the inner portions of said conduit-walls, whereby end thrust of said pipe in either direction is transmitted to said conduit-walls.

9. The combination with a conduit, a line of pipe therein, a recess in said conduit, and a coupling or sleeve on said pipe within said chamber, of an anchor-plate on said pipe within said chamber adapted to bear with one face against an end edge of said coupling or sleeve and with the other faces against the end of said chamber proximate to the end of said coupling or sleeve.

10. The combination with a conduit having an interior chamber, lengths of pipe within said conduit whose adjacent ends project into said chamber, and a coupling connecting said pipe ends, of anchor-plates on said pipes adapted to bear against the end faces of said couplings and against the end walls of said chamber.

11. The combination with a conduit having an interior chamber, lengths of pipe within said conduit whose adjacent ends project into said chamber a coupling connecting said ends, plates on said pipes adapted to bear with their proximate faces against the end faces of said coupling, and with their outer faces against the end walls of said chamber.

12. The combination with a conduit, having an interior chamber, lengths of pipe within said conduit whose adjacent ends project into said chamber, and a coupling connecting said ends, of anchor-plates surrounding said pipes and having sliding engagement thereon, adapted to bear with their proximate faces against the end faces of said coupling and with their outer faces against the end walls of said chamber.

13. The combination with a conduit having an interior chamber, lengths of pipe within said conduit whose adjacent ends project into said chamber, and a coupling connecting said ends, of an anchor-plate on each pipe length comprising a collar adapted to have sliding engagement with said pipe and to bear against the end face of said coupling, and a flange extending from said collar into said chamber, adapted to bear with the face remote from said end face of said coupling against the side of said chamber.

14. The combination with a conduit, having walls consisting of superimposed layers, an interior chamber in said conduit formed by cutting away the interior layers of its walls for a portion of their length, pipe lengths within said conduit whose adjacent ends extend into said chamber and a coupling connecting said ends, of anchor-plates on said pipe lengths, each adapted to bear against an end face of said coupling and against the ends of said interior layers, proximate to said end face.

15. The combination with a conduit having walls consisting of superimposed layers, an interior chamber in said conduit formed by cutting away the interior structure of its walls for a portion of their length, pipe lengths within said conduit whose adjacent ends extend into said chamber, and a coupling connecting said ends, of anchor-plates, each comprising a collar having sliding engagement with said pipe lengths, adapted to bear against an end face of said coupling, and a flange extending from said collar adapted to bear against the ends of said interior structure proximate to said end face.

LOUIS TEUSCHER.

Witnesses:
A. J. STAHL,
I. J. SMITH.